United States Patent

Friedman et al.

[11] Patent Number: 5,765,135
[45] Date of Patent: Jun. 9, 1998

[54] SPEECH THERAPY SYSTEM

[75] Inventors: Arye Friedman; Eliezer Fetterman, both of Atniel; Vladimir Zeitlin, Jerusalem, all of Israel

[73] Assignee: Speech Therapy Systems Ltd., Kiryat Arba, Israel

[21] Appl. No.: 888,598

[22] Filed: Jul. 7, 1997

Related U.S. Application Data

[63] Continuation of Ser. No. 401,139, Mar. 8, 1995, abandoned.

[30] Foreign Application Priority Data

Mar. 9, 1994 [IL] Israel ......................... 108908

[51] Int. Cl.$^6$ ................................................. H04R 29/00
[52] U.S. Cl. ..................... 704/276; 704/270; 434/185; 364/413.02; 364/413.03; 364/413.04; 128/721; 128/905; 600/23
[58] Field of Search .................. 364/413.01, 413.02, 364/413.03, 413.04; 84/600; 434/185; 128/670, 716, 721, 723, 731, 905; 600/23; 704/276, 270

[56] References Cited

U.S. PATENT DOCUMENTS

| | | | |
|---|---|---|---|
| 4,686,999 | 8/1987 | Snyder et al. | 128/716 |
| 4,732,159 | 3/1988 | Kraman | 128/721 |
| 4,776,345 | 10/1988 | Cohen et al. | 128/731 |
| 4,777,962 | 10/1988 | Watson et al. | 128/716 |
| 4,803,997 | 2/1989 | Bowman | 128/723 |
| 4,980,917 | 12/1990 | Hutchins | 395/2.63 |
| 4,982,738 | 1/1991 | Griebel | 128/670 |
| 4,999,772 | 3/1991 | Bowman et al. | 364/413.05 |
| 5,047,930 | 9/1991 | Martens et al. | 364/413.04 |
| 5,166,463 | 11/1992 | Weber | 84/600 |
| 5,274,548 | 12/1993 | Bernard et al. | 364/413.01 |
| 5,406,956 | 4/1995 | Farwell | 128/731 |
| 5,474,090 | 12/1995 | Begun et al. | 128/707 |
| 5,520,176 | 5/1996 | Cohen | 128/630 |
| 5,532,936 | 7/1996 | Perry | 364/514 A |

FOREIGN PATENT DOCUMENTS 1 588 217  4/1981  European Pat. Off. .

*Primary Examiner*—Krista Zele
*Assistant Examiner*—Scott Wolinsky
*Attorney, Agent, or Firm*—Jacobson, Price, Holman & Stern, PLLC

[57] ABSTRACT

The invention provides a speech therapy system, comprising a first channel including a microphone, and a first analog-to-digital (A/D) transducer for transducing voice signals from the microphone into digital form, a second channel including at least one respiration sensor attachable to a user's body for detecting breathing motion, and a second A/D transducer connected to the sensor for transducing breathing motion signals into digital form. The system further includes a processing, video display and voice output unit, to which the first and second channels are connected, for the simultaneous display of voice and breathing motion patterns while effecting the sounding of the voice signals.

14 Claims, 1 Drawing Sheet

SPEECH THERAPY SYSTEM

This is a continuation of application Ser. No. 08/401,139, filed Mar. 8, 1995 which was abandoned upon the filing hereof.

BACKGROUND OF THE INVENTION

The present invention relates to a speech therapy system, and more particularly to a system for training and improving proper coordination between respiration and voice production.

Known speech therapy apparatus includes trainers for treating stuttering by improving abdominal respiration, or, alternatively, for correcting incorrect sounds characteristics as compared to correct reference sounds. It has been found that many of the problems surrounding smooth and correct speech originate in the lack of coordination between respiration and voice production, thus causing speech defects.

SUMMARY OF THE INVENTION

It is therefore a broad object of the present invention to provide a system to ameliorate the above-described problem, and to improve coordination between respiration and voice.

It is a further object of the present invention to provide a system for simultaneously displaying voice and breathing motion patterns, while effecting an audio signal of the user's voice.

In accordance with the invention, there is therefore provided a speech therapy system comprising a first channel including a microphone, and a first analog-to-digital (A/D) transducer for transducing voice signals from said microphone into digital form; a second channel including at least one respiration sensor attachable to a user's body for detecting breathing motion, and a second A/D transducer connected to said sensor for transducing breathing motion signals into digital form, and a processing, video display and voice output unit, to which said first and second channels are connected, for the simultaneous display of voice and breathing motion patterns while effecting the sounding of said voice signals.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
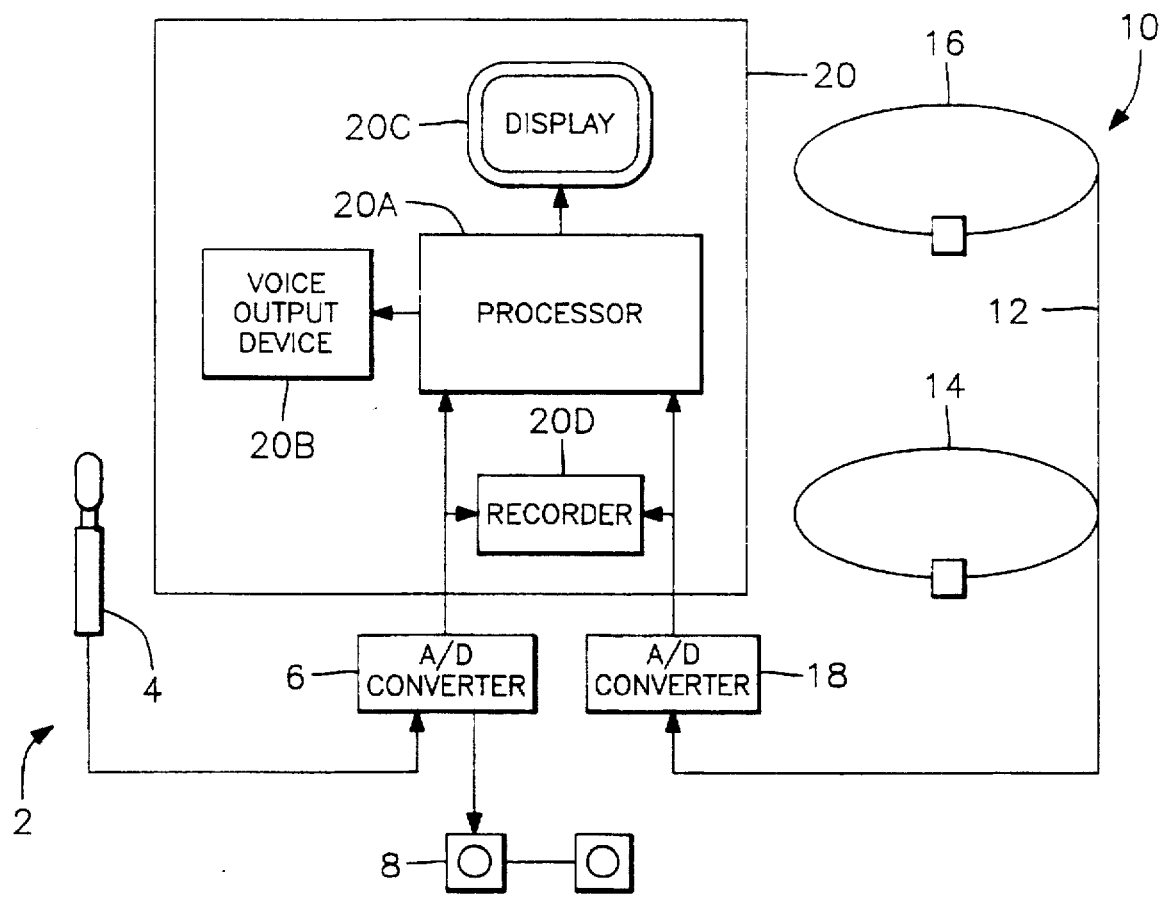
FIG. 1 is a schematic view of a speech therapy system according to the present invention.

There is seen in FIG. 1 the speech therapy system according to the present invention, which includes a first channel 2 comprising a microphone 4 connected to a first A/D transducer 6. To the same transducer 6 there may also be connected a loudspeaker or headphones 8.

A second channel 10 is provided, comprising a respiration sensor 12, advantageously being two separate body motion detection sensors: a first sensor 14, configured to be applied to the abdominal region of the body of a user, for detecting motion of the abdominal wall, and a second sensor 16 configured to be applied around the user's chest, for detecting respiration motion thereof. The sensor 12 is connected to a second transducer 18.

The two channels 2 and 10 are connected to a processing video display and voice output unit 20, for the simultaneous display of voice and breathing motion patterns. The unit 20 therefore includes a processor 20A, a video display 20C and a voice output device 20B.

While in FIG. 1 the loudspeaker or headphones 8 are shown attached to the first transducer 6, whereby the output voice is produced by reconverting the digital signals fed to unit 20 back into analog signals, the voice output could just as well be obtained through the loudspeaker or headphones 8 being directly connected to unit 20 via the voice output device 20B. In the latter case, the microphone can, in addition to being connected to the A/D transducer for signal processing and display purposes, also be electrically connected directly to unit 20.

The unit 20 serves, in effect, as a computerized control center for generating and displaying optimal breathing motions patterns on which there are optionally superimposed speech patterns, while simultaneously effecting the sounding of the voice through the loudspeaker or headphones. The unit 20 may also include a recorder for recording signals from the first and second channels 2 and 10, to be eventually reproduced.

Figure 2:
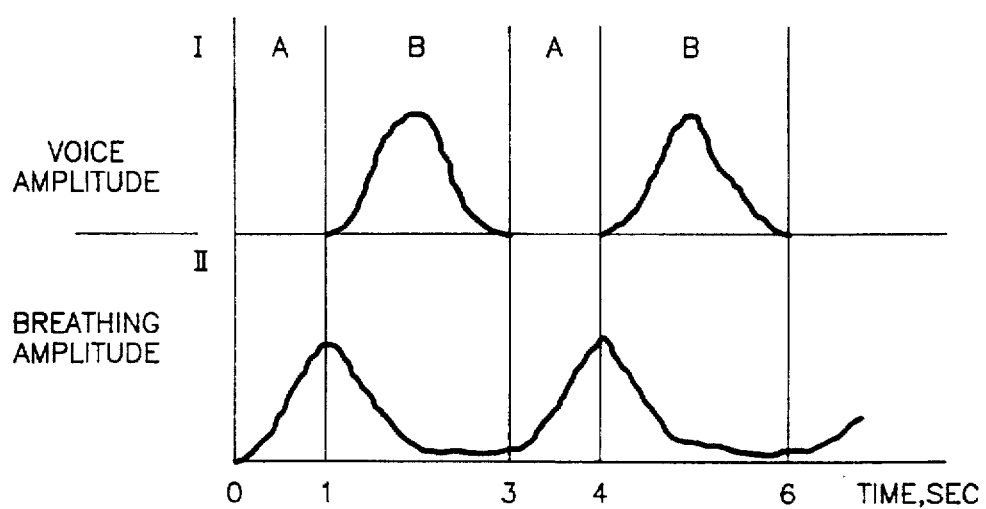
FIG. 2 is a representative illustration showing required coordination between voice and abdominal breathing.

An example of required coordination between voice and abdominal breathing is shown in FIG. 2. Depicted are two zones I and II, one above the other for visual comparison purposes. Zone I represents voice amplitude of a signal as obtained from the microphone 4, and zone II represents breathing amplitude of a signal as obtained from the sensor 14. The zones are divided into a region A, defining an inspiration stage, and region B, defining an expiration stage.

During use of the system, the user generally perceives three reference signals: the sounded voice, chest respiration, and abdominal respiration. In FIG. 2, only two reference signals are depicted. The user's task is to train and improve proper coordination between respiration and voice production. Some of the basic rules or guidelines are as follows:

1. the inspiration stage must last approximately 1 second;
2. there should be no break between the inspiration stage and the expiration stage;
3. voice must begin simultaneously with the beginning of expiration;
4. the voice amplitude must be of the form as in curve I, FIG. 2;
5. expiration must last 2.0–2.3 seconds, when the voice lasts 2 seconds;
6. the respiration curve must be generally of the form as in curve II, FIG. 2, and
7. the correlation between voice I and abdominal respiration II must be as shown in FIG. 2.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A speech therapy system for training and improving proper coordination between respiration and voice production of a user, said system comprising:

a first channel, including a microphone and a first analog-to-digital transducer connected to said microphone, for converting the user's voice into digital voice signals;

a second channel, including at least one respiration sensor attachable to the user's body for detecting the user's breathing motion, and a second analog-to-digital transducer connected to said sensor for converting the user's breathing motion into digital breathing motion signals; and a unit connected to said first and second channels, said unit including a processor for receiving and processing said digital voice and breathing motion signals and a video display for displaying the processed signals on said display while the user is speaking, thereby providing a reference for the user to coordinate the user's voice with the user's breathing motion.

2. The system as claimed in claim 1, further comprising a loudspeaker or headphones connected to said unit.

3. The system as claimed in claim 1, wherein said first channel further comprises a loudspeaker or headphones connected to an output from said first analog-to-digital transducer, for emitting said voice signals in audible form.

4. The system as claimed in claim 1, wherein said respiration sensor is configured to be attachable to the user's abdomen.

5. The system as claimed in claim 1, wherein said respiration sensor includes a sensor portion configured to be attached to the user's chest.

6. The system as claimed in claim 1, wherein said unit further comprises recording means connected to said first and second channels for recording signals from said first and second channels, to be eventually reproduced.

7. A speech therapy method for training and improving proper coordination between respiration and voice production of a user, said method comprising the steps of:

converting the user's voice into digital voice signals;

converting the user's breathing motion into digital breathing motion signals; and receiving said digital voice and breathing motion signals, processing the received signals and displaying the processed signals while the user is speaking, thereby providing a reference for the user to coordinate the user's voice with the user's breathing motion.

8. A speech therapy system for training and improving proper coordination between respiration and voice production of a user, said system comprising:

a first channel, including a microphone and a first analog-to-digital transducer connected to said microphone, for converting the user's voice into digital voice signals;

a second channel, including at least one respiration sensor attachable to the user's body for detecting a user's breathing movement associated with a user's breathing, and a second analog-to-digital transducer connected to said sensor for converting the user's breathing movement into digital breathing movement signals; and a unit connected to said first and second channels, said unit including a processor for receiving and processing said digital voice and breathing movement signals and a video display for displaying the processed signals on said display while the user is speaking, thereby providing a reference for the user to coordinate the user's voice with the user's breathing movement.

9. The system as claimed in claim 8, further comprising a loudspeaker or headphones connected to said unit.

10. The system as claimed in claim 8, wherein said first channel further comprises a loudspeaker or headphones connected to an output from said first analog-to-digital transducer, for emitting said voice signals in audible form.

11. The system as claimed in claim 8, wherein said respiration sensor is configured to be attachable to the user's abdomen.

12. The system as claimed in claim 8, wherein said respiration sensor includes a sensor portion configured to be attached to the user's chest.

13. The system as claimed in claim 8, wherein said unit further comprises recording means connected to said first and second channels for recording signals from said first and second channels, to be eventually reproduced.

14. A speech therapy method for training and improving proper coordination between respiration and voice production of a user, said method comprising the steps of:

converting the user's voice into digital voice signals;

converting a user's breathing movement associated with a user's breathing into digital breathing movement signals; and receiving said digital voice and breathing movement signals, processing the received signals and displaying the processed signals while the user is speaking, thereby providing a reference for the user to coordinate the user's voice with the user's breathing movement.

* * * * *